United States Patent
Bamford et al.

(10) Patent No.: US 6,633,891 B1
(45) Date of Patent: Oct. 14, 2003

(54) MANAGING REPLACEMENT OF DATA IN A CACHE ON A NODE BASED ON CACHES OF OTHER NODES

(75) Inventors: Roger Bamford, Woodside, CA (US); William H. Bridge, Jr., Alameda, CA (US); David Brower, Alamo, CA (US); Neil MacNaughton, Los Gatos, CA (US); Angelo Pruscino, Los Altos, CA (US); Tak Fung Wang, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 09/652,384

(22) Filed: Aug. 31, 2000

Related U.S. Application Data (63) Continuation-in-part of application No. 09/199,120, filed on Nov. 24, 1998, now Pat. No. 6,353,836.

(51) Int. Cl.⁷ .............................................. G06F 17/30
(52) U.S. Cl. ....................................... 707/203; 711/118
(58) Field of Search ............................... 707/200, 203; 710/56; 711/118

(56) References Cited

U.S. PATENT DOCUMENTS

| | | | | |
|---|---|---|---|---|
| 5,193,162 A | | 3/1993 | Bordsen et al. | 711/152 |
| 5,297,269 A | | 3/1994 | Donaldson et al. | 711/145 |
| 5,327,556 A | * | 7/1994 | Mohan et al. | 707/8 |
| 5,680,576 A | | 10/1997 | Laudon | 711/145 |
| 5,829,032 A | | 10/1998 | Komuro et al. | 711/141 |
| 6,092,157 A | | 7/2000 | Suzuki | 711/147 |
| 6,154,811 A | * | 11/2000 | Srbljic et al. | 711/118 |
| 6,256,712 B1 | | 7/2001 | Challenger et al. | |
| 6,353,836 B1 | | 3/2002 | Bamford et al. | |
| 6,418,514 B1 | * | 7/2002 | Arimilli et al. | 711/133 |

FOREIGN PATENT DOCUMENTS

| | | |
|---|---|---|
| EP | 0 471 282 A2 | 2/1992 |
| EP | 0 657 813 A1 | 6/1995 |
| EP | 0750260 A2 | 6/1996 |

OTHER PUBLICATIONS

Michael J. Feeley, et al., "Implementing Global Memory Management in a Workstation Cluster," Dec. 1995, pp. 201–212.

Rana Ejaz Ahmed, et al., "Cache–Aided Rollback Error Recovery (CARER) Algorithms for Shared–Memory Multiprocessor Systems," 1990, IEEE, pp. 82–88.

Anne–Marie Kermarrec, et al., "A Recoverable Distributed Shared Memory Integrating Coherence and Recoverability," Jun. 27, 1995, IEEE, XP 000597800, pp. 289–298.

* cited by examiner

Primary Examiner—John Breene
Assistant Examiner—Cheryl Lewis
(74) Attorney, Agent, or Firm—Marcel K. Bingham; Hickman Palermo Truong & Becker LLP (57) ABSTRACT

A mechanism is described for managing the caches on nodes in a cluster. The caches are globally managed so that a data item may be retained in any cache on the nodes. This may be accomplished by, for example, a replacement policy for replacing data items stored in the buffers of the caches, where a buffer is selected for replacement in a manner that accounts for factors that include the state of the caches of other nodes. Some cached data items are designated as globally shared, and assigned (either statically or dynamically) a primary cache. For example, if a buffer holds a copy of a data item whose primary cache is another node, then the data item in the buffer is favored for replacement over a local data item or a global data item for which this is the primary cache. According to another aspect of the invention, the cache retention value of buffers on different nodes are compared, and the buffer with the lowest cache retention value is selected for replacement. According to yet another aspect of the present invention, the replacement policy accounts for the configuration of other caches in the cluster.

30 Claims, 4 Drawing Sheets

MANAGING REPLACEMENT OF DATA IN A CACHE ON A NODE BASED ON CACHES OF OTHER NODES

RELATED APPLICATION

This application is a continuation-in-part of related U.S. application Ser. No. 09/199,120, U.S. Pat. No. 6,353,836B1 filed Nov. 24, 1998, entitled Method and Apparatus for Transferring Data From the Cache of One Node to the Cache of Another Node, and naming as inventors Boris Klots and Roger J. Bamford, herein referred to as Klots, the entire disclosure of which is hereby incorporated by reference.

FIELD OF THE INVENTION

The present invention relates to cache management and, more particularly, to managing replacement of data in a cache on a node based on caches of other nodes.

BACKGROUND OF THE INVENTION

A cluster is a collection of nodes, each with a volatile dynamic memory devices ("dynamic memory") that is shared by one or more CPUs. Each node in a cluster is connected to the other nodes in the cluster via an interconnect. Typically, each node in the cluster shares resources with other nodes in the cluster. Such resources may be, for example, data items, such as pages stored on a static memory device (e.g. disk storage devices).

Software, referred to as an application, runs on each of the nodes. The application operates upon data from shared data resources. For example, a database system may run on each node in the cluster and manage data stored on data blocks on the disk storage devices.

To speed access to data items needed by an application running on a node in a cluster, copies of the data items are kept in the cache of the node. A cache is a storage medium used to store a copy of a data item for efficient access, where that data item may be obtained less efficiently from another source. The other, less-efficiently-accessed source is herein referred to as a secondary data resource. For example, a database system running on a node in a cluster typically stores data blocks durably on disk. However, the database system loads copies of the data blocks in a cache in dynamic memory to access them. Similarity, a browser running on a personal computer stores frequently accessed web pages, obtained over a network, in a cache in the form of disk files.

A cache on a node is managed by a cache manager. A cache manager is a system of software that attempts to manage a cache in a manner that reduces input and output between the cache and a secondary data resource. Typically, the cache manager keeps a copy of the most frequently accessed data items in the cache. In addition, a cache manager may track modifications made by an application to a data item, and may arrange, through "write back", "write through", and various logging mechanisms, that each data item is durably stored in a secondary data resource (e.g. disk storage device).

Data items frequently accessed by a particular application are collectively referred to as the working set of the application. When the working set of an application is too big to fit into the cache on a node on which the application is running, the application thrashes. Thrashing involves replacing cached data items in a cache with data items from secondary data resources at an undesirably high frequency. Thrashing occurs when frequently accessed data items continuously replace each other in the cache, causing frequent cache misses and thereby drastically increasing the average data item access time. When thrashing is occurring and an application needs data items, the application is too often delayed by waiting for the retrieval of a needed data item from the secondary data resource. Thrashing thus reduces throughput. On the other hand, when the working set can fit into available dynamic memory, the application does not thrash, and the throughput of the system is improved.

A scalable cluster is a cluster to which resources may be added to proportionally increase the capacity of the cluster as a whole. A resource may be, for example, a computer, a CPU, a storage device, interconnect bandwidth, or dynamic memory per computer. Typically, capacity is measured according to some measure of business growth, such as the number of users, web page hits per second, transactions per period of time, and/or terabytes of data.

As the need for capacity grows in a cluster, usually the need for CPUs grows, and sometimes the working set grows. To accommodate the need for additional CPUs, more nodes may be added to the cluster. However, accommodating an increased working set requires more than just adding computers to the cluster. Rather, the dynamic memory of all the nodes in the cluster must be increased because each node needs enough dynamic memory to store the working set. Each node needs enough dynamic memory to store the entire working set because a large portion of the frequently accessed pages are typically duplicated in the cache of each node.

For any computer, the amount of dynamic memory that may be added is limited. Even before the limit is reached, the total amount of dynamic memory required by the application is equal to its working set multiplied by the number of nodes in the cluster. As the cluster grows, if the working set grows as well, then the price-performance decreases with cluster size, and so the cluster does not scale. If the working set is larger than the limit, then the application thrashes. Adding nodes to the cluster may increase the CPU capacity of the cluster, but will not eliminate the thrashing. Consequently, the throughput of the cluster suffers.

Based on the foregoing, it is desirable to provide a mechanism to reduce thrashing on a cluster that does not require adding dynamic memory to each node in the cluster.

SUMMARY OF THE INVENTION

A mechanism is described for managing the caches on nodes in a cluster. The caches are globally managed so that a data item may be retained in any cache on the nodes. This may be accomplished by, for example, a replacement policy for replacing data items stored in the buffers of the caches, where a buffer is selected for replacement in a manner that accounts for factors that include the state of the caches of other nodes. Some cached data items are designated as globally shared, and assigned (either statically or dynamically) a primary cache. For example, if a buffer holds a copy of a data item whose primary cache is another node, then the data item in the buffer is favored for replacement over a local data item or a global data item for which this is the primary cache. According to another aspect of the invention, the cache retention value of buffers on different nodes are compared, and the buffer with the lowest cache retention value is selected for replacement. According to yet another aspect of the present invention, the replacement policy accounts for the configuration of other caches in the cluster.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing caches on the nodes of a cluster is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

EXEMPLARY CLUSTER

Figure 1:
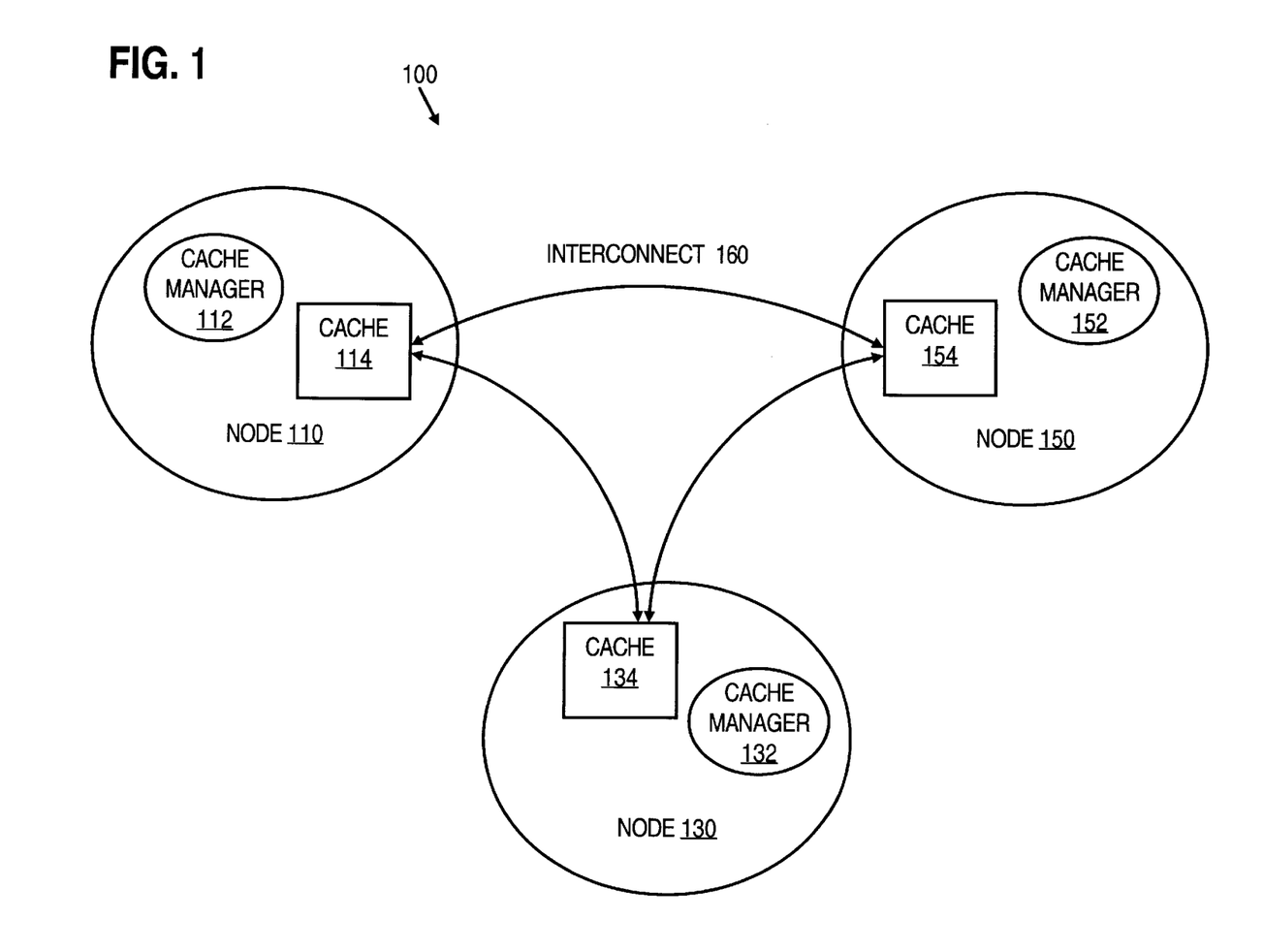
FIG. 1 is a block diagram of an exemplary cluster.

FIG. 1 is a block diagram that depicts an exemplary cluster 100 upon which an embodiment of the present invention may be implemented. Cluster 100 includes nodes 110, 130, and 150. Interconnect 160 connects nodes 110, 130, and 150, such that any node in cluster 100 may transfer data to the dynamic memory of another computer.

Each of nodes 110, 130, and 150 include a cache and a cache manager. Specifically, node 110 includes cache 114 and cache manager 112, node 130 includes cache 134 and cache manager 132, and node 150 includes cache 154 and cache manager 152. While an embodiment of present invention is illustrated using caches that each reside on different nodes, the present invention is not limited to caches that each reside on different nodes. Rather, the present invention may be implemented with caches that include a subset of caches that reside on the same node, or that all reside on the same node.

Caches 114, 134, and 154 are managed respectively by cache managers 112, 132 and 152 to store data items accessed by a set of applications running on cluster 100. In an embodiment of the present invention, the set of applications may be a database system. Each of cache managers 112, 132, and 152 run under the control of a database system. Caches 114, 134, and 154 are used to store data blocks that contain data managed by the database system.

Cache managers 112, 132, and 152 collectively form a "coherent cluster cache manager". A coherent cluster cache manager is a system of software running on a cluster that globally manages the caches in such a way that when an application requests access to a data item in a given cache, and the data item is not stored in the given cache but is stored in another cache, a copy of the data item is copied directly from the other cache to the given cache. If the data item has been modified, a copy of the data item as modified may be transferred to the given cache without first durably storing the data item to a secondary data resource. An example of a coherent cache manager is disclosed in Klots, which describes a database system that manages a cache.

A coherent cluster cache manager differs from the typical conventional cache manager on a cluster. A conventional cache manager typically operates on a node in a cluster, and when the node requires a data item that is not cached on the node, it gets a copy of a data item from a secondary data resource, not from the cache of another node. In fact, the conventional cache manager has no knowledge that a copy of the requested data item exits in another cache, whether the cache resides on the same node or a different node. Thus, to get a copy of the data item, a conventional manager incurs the cost of accessing a secondary data resource, such as a disk storage system.

Accessing a secondary data resource, such as a disk storage system, entails relatively expensive input and output operations. On the other hand, accessing the dynamic memory on another node in the cluster is a relatively inexpensive operation. Thus, getting a copy of a data item from another cache, whether or not the cache is on another node, is far cheaper than getting a copy from a secondary data resource.

With the ability to more cheaply get a requested data item from another cache, duplicates of frequently accessed data items can be removed from some caches without causing thrashing, as long as they are retained in at least one cache in the cluster. Rather than re-retrieving a copy of a frequently accessed page from a secondary data resource, a copy is re-retrieved far less expensively from the cache of another node.

Because duplication of data items may be reduced without causing thrashing, apportioning the working set among the nodes in a cluster becomes feasible. Because the working set is divided between rather than duplicated on all the nodes, additional dynamic memory for a working set may be provided by adding a node to the computer, rather than increasing the dynamic memory of all the nodes. For the purposes of efficiency, the size of the working set is therefore not, restricted by the dynamic memory capacity of a computer, and consequently, scalability is not limited by the size of the working set and the dynamic memory capacity of the nodes in the cluster.

For example, there are 1000 data blocks frequently accessed by a database system running on a four node cluster. When the working set is apportioned, the frequently accessed blocks do not have to be duplicated in the caches of the nodes. The working set may therefore be divided so that each of the caches holds 250 of the frequently accessed data blocks. If another node is added, then each of the nodes would have to hold 200 blocks. If the working set is not divided, then each node must have enough dynamic memory to hold 1000 blocks.

REPLACEMENT POLICIES THAT REDUCE DUPLICATION OF DATA ITEMS

The techniques described herein for reducing the duplicates of data items stored in global cache are incorporated into the replacement policy of a cache manager. The term global cache is used herein to refer to a set of caches of one or more nodes, for example, the nodes in a cluster, where each of the caches holds data items accessed by a set of one or more applications. A particular cache managed by a cache manager is referred to as a local cache with respect to the cache manager. A replacement policy is the set of rules and procedures followed by a cache manager to select a buffer that already contains a data item when a buffer is needed to hold a given data item. The data item in the selected buffer is replaced with the given data item. Consequently, the cache manager selects a buffer that contains data that has a relatively low cache retention value.

Cache retention value is a measure of the degree to which retaining a data item in the cache benefits the efficient operation of the cache. Typically, the data items that will be most frequently accessed have greater cache retention value because retaining them in cache avoids a greater number of input and output operations between the cache and secondary data source. The term retain refers to executing operations that increase the likelihood that a particular data item will remain in a cache longer than another data item, typically a data item with lower cache retention value. Retain may refer to selecting for replacement another data item, or simply assigning a lower cache retention value for the other data item.

A variety of factors may be used to determine the cache retention value of a buffer. For example, the most recently accessed data items usually have a greater cache retention value than the least recently accessed because the most recently accessed data items are the most likely to be accessed in the future. A cache manager may maintain a least recently used list (LRU), which orders buffers from the most recently accessed to the least recently accessed. The most recently accessed items are at the top of the list and the least recently used are at the bottom of the list. Thus, the position of a buffer within an LRU indicates the cache retention value of the data item held within a buffer. Another factor that may be considered is how frequently a data item is accessed within a recent period of time. The data items most frequently accessed in the immediate past have a greater cache retention value because these data items are the most likely to be accessed in the near future. In determining the cache retention value according to the techniques described herein, a cache manager follows a replacement policy that also accounts for factors involving the global cache, not just one local cache. One of these factors is whether a data item is duplicated in the caches of a global cache.

REDUCING DUPLICATE COPIES OF A DATA ITEM

Figure 2:
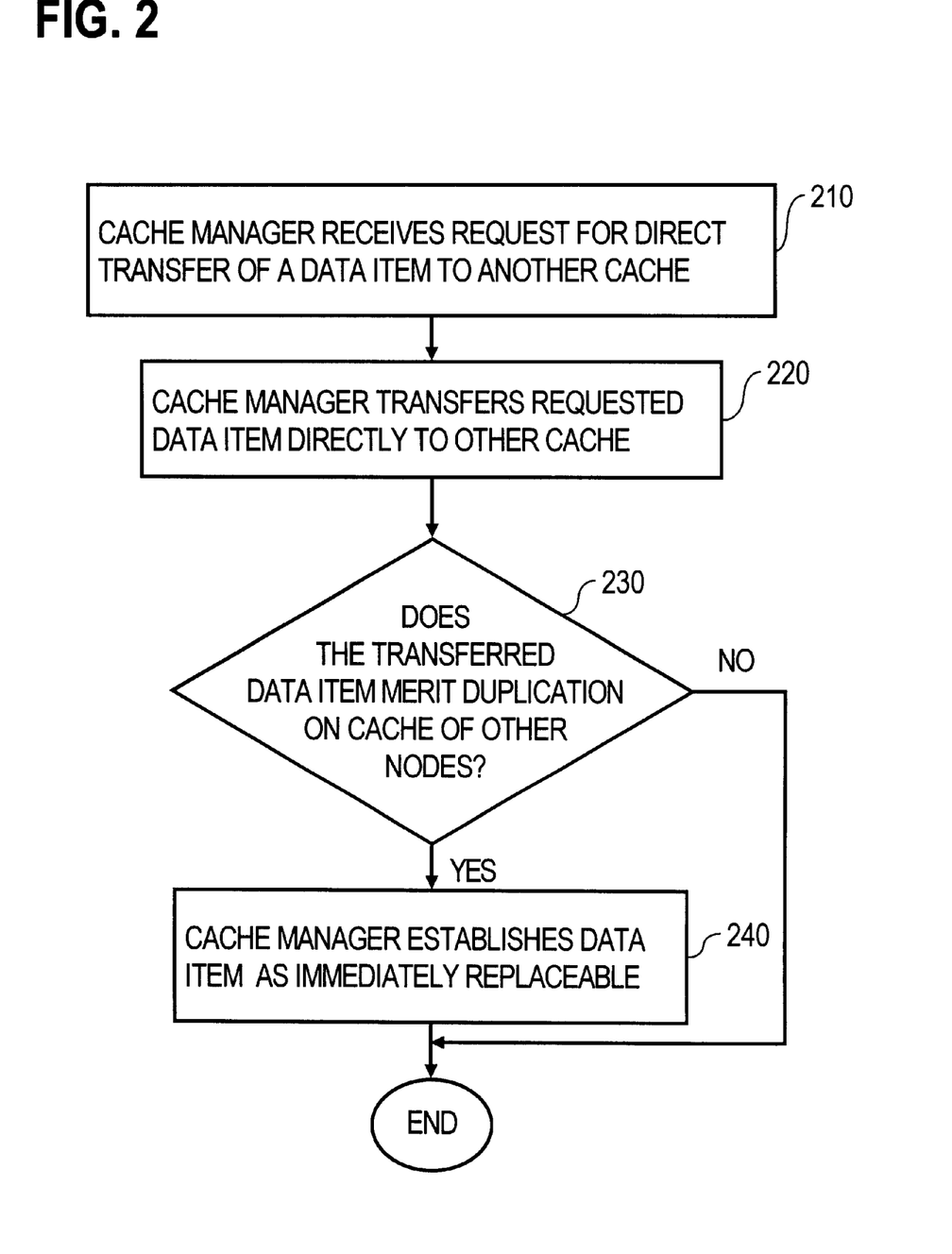
FIG. 2 is a flowchart of a process that implements techniques for managing a cache according to an embodiment of the invention.

FIG. 2 is a flow chart depicting a process that may be followed to implement, at least in part, a replacement policy that reduces duplicate copies of data items in the caches of a cluster. The steps are performed by a cache manager when it receives a request for a data item in the cache being managed by the cache manager. The steps are illustrated using Cluster 100 shown in FIG. 1.

Referring to FIG. 1, at step 210, cache manager 112 receives a request from cache manager 132 to directly transfer a data item stored in cache 114 to cache 134. At step 220, the cache manager 112 directly transfers the requested data item to cache 134.

At step 230, it is determined whether the data item transferred is a data item that merits duplication in other caches. Generally, data items that merit duplication have such a high cache retention value that the cost of duplicating them in terms of, for example, increased dynamic memory usage, justifies their duplication. For example, the most frequently accessed data items in the cache 110 may merit duplication. If it is determined that the data item transferred is a data item that merits duplication, the steps shown in FIG. 1 end. Otherwise, execution of the steps proceeds to step 240.

At step 240, cache manager 112 establishes the buffer holding the data item as replaceable. Establishing the buffer as replaceable qualifies it for selection during replacement processing. There are a variety ways to establish a buffer replaceable. For example, a buffer may be marked as being immediately replaceable by setting a flag in the buffer, or added to list of buffers that are replaceable.

When cache manager 112 performs replacement processing, it may select a buffer that has been established as immediately replaceable. The buffer may be selected even though, for example, its place on an LRU maintained by cache manager 112 indicates that the buffer holds a data item whose recency of access is relatively high. When a cache manager selects for replacement a buffer that has been established as immediately replaceable because the buffer's data item was transferred to another cache, the cache manager is following a replacement policy that accounts for the state of global cache. Specifically, the cache manager is replacing the data item at least part because it is stored in another cache.

On the other hand, the existence of a copy of data item on another cache is but one factor that may be used to select a buffer for replacement of its contained data. Other factors to consider include those mentioned already, such as the position of a buffer in an LRU list.

ACCOUNTING FOR THE CACHE RETENTION VALUE BETWEEN DATA ITEMS IN DIFFERENT CACHES

Figure 3:
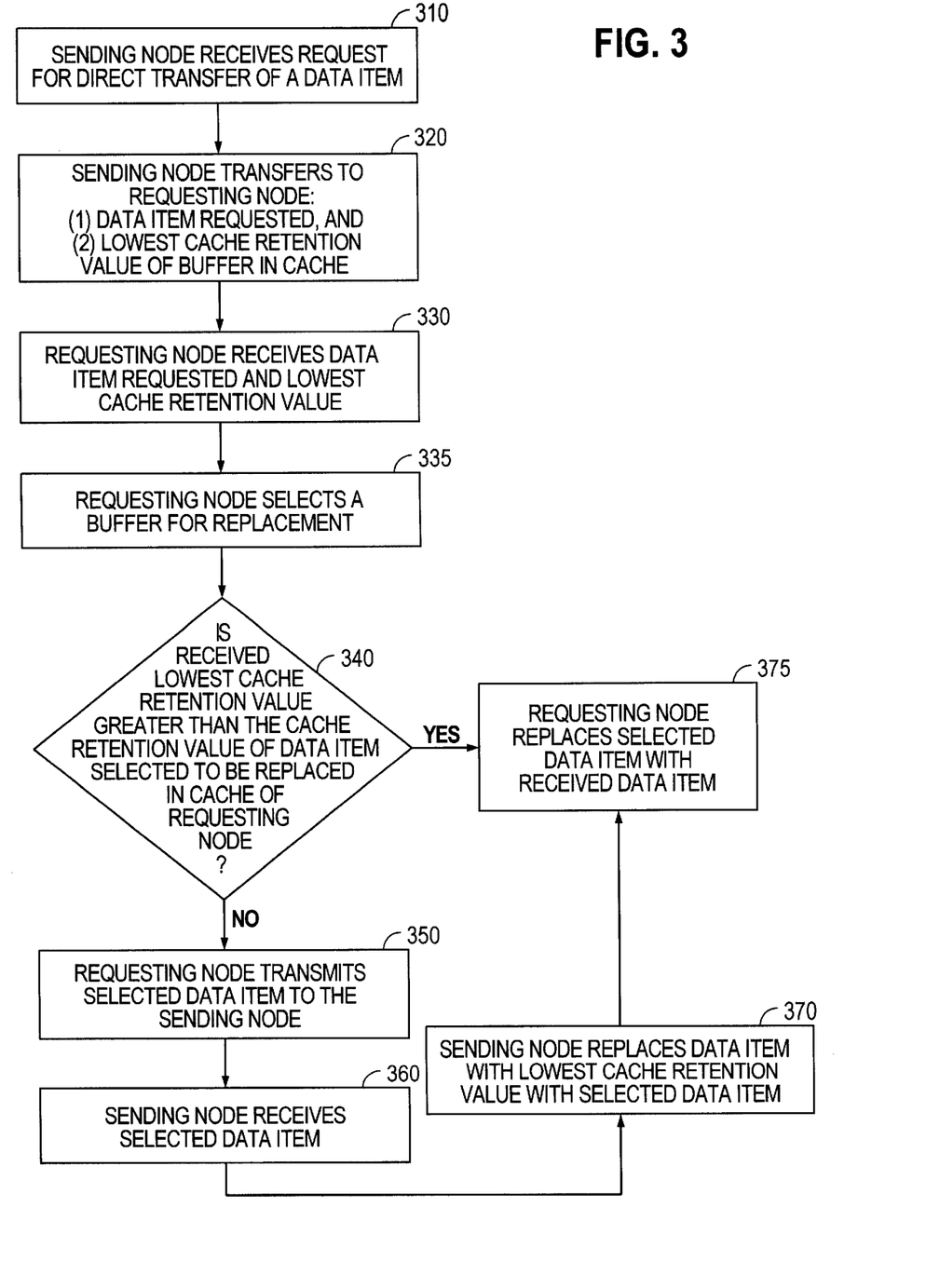
FIG. 3 is a flowchart of a process that implements techniques for managing a cache according to an embodiment of the invention.

A replacement policy that accounts for whether a data item has been duplicated on another cache is but one example of how the state of caches on multiple nodes in a cluster may be accounted for. FIG. 3 depicts another process that accounts for the state of caches on multiple nodes. The process is performed when one cache manager requests a data item stored in the cache of another node.

Referring to FIG. 3, at step 310, cache manager 112 receives a request from cache manager 132 to directly transfer a data item stored in cache 114.

At step 320, the cache manager 112 directly transfers to cache manager 132 the requested data item and the data that indicates the lowest cache retention value associated with any buffer in the cache 114. The buffer in cache 114 with the lowest cache retention value need not be the buffer in cache 114 in which the requested data item resides. Various mechanisms may be used to establish the cache retention values of buffers. For example, data that indicates the lowest cache retention value may be data that indicates the last time a data item was accessed, or data that specifies the frequency with which it was accessed within a period of time.

At step 330, the cache manager 132 receives the requested data item and the data indicating the lowest cache retention value ("received cache retention value").

At step 335, cache manager 132 selects a buffer in cache 134 for replacement with the requested data item transmitted from cache manager 112 to cache manager 132.

At step 340, the cache manager 132 determines whether the received cache retention value is greater than the cache retention value of the data item in the buffer selected for replacement (the "selected data item"). If selected data item has a cache retention value that is greater than the received retention value, then control proceeds to step 350, where cache manager 132 transmits the selected data item to cache manager 112.

If, on the other hand, the received cache retention value is greater than the cache retention value of the selected data item, then at step 375, the requesting node replaces the selected data item with the received data item, without having transmitted the selected data item to the cache manager 112.

At step 350, cache manager 132 transmits the selected data item to cache manager 112. At step 360, cache manager 112 receives the selected data item. At step 370, cache manager 112 replaces with the selected data item a data item in a buffer with the lowest cache retention value in cache 114. Control then proceeds to step 375.

REPLACEMENT POLICIES BASED ON THE CONFIGURATION OF THE GLOBAL CACHE

The techniques described herein incorporate replacement policies that account for the global state of the caches in a cluster. Replacement policies may, however, account for global considerations other than the global state of cache. For example, the replacement policy for a particular cache may be based on the configuration of other caches. The configuration of a cache is the logic and values that govern the operation of cache that do not change during the operation of a cache. The state of a cache, on the other hand, is collectively the current values that change during the operation of the cache. For example, the state of a cache includes the data item in a buffer of a cache. In addition, the state of a cache includes values that represent an attribute of the buffer or the data item in the buffer that change as the cache is operated upon, such as the position of a buffer in an LRU, or the frequency of access of a buffer. The configuration of the cache may include software that governs the operation of the cache, and operational parameter values such as the size of the cache, or the number of buffers in the cache.

The following example illustrates how a replacement policy of a cache may be based on the configuration of other caches. Assume that a database system is running on a cluster, and that the caches on the nodes of the cluster are configured so that a cache is a "home" to a particular set of data blocks. A cache that is "home" to a particular set of data blocks is herein referred to as the primary cache for those set of data blocks. When a cache manager must select a buffer in cache for replacement, a cache manager first selects buffers with data items whose primary cache is another cache, before selecting data items without a primary cache or whose primary cache is the current cache. When a cache manager selects a buffer in the cache managed by the cache manager because the configuration of another cache makes it the primary cache of the data item in the buffer, a cache manager is following a replacement policy that accounts for the configuration of the another cache.

PRIMARY CACHES FOR SHARED NOTHING SYSTEMS

A further example of a replacement policy based on the primary cache of a data item is a replacement policy for a global cache where a primary cache for a particular data item is a cache on a node that may directly access the secondary data resource for a data item. Treating the cache as a primary cache for a data item in this manner may be particularly advantageous for a shared nothing system. A description of shared nothing systems is therefore useful.

There are three general types of multi-processing systems: shared everything, shared disk systems, and shared nothing systems. In shared everything systems, processes on all processors have direct access to all dynamic memory devices and to all static memory devices in the system. A high degree of wiring between the various computer components is required to provide shared everything functionality.

In shared disk systems, processors and dynamic memory devices are grouped into nodes. Each node in a shared disk system may itself constitute a shared everything system that includes multiple processors and multiple memories. Processes on all processors can access all static memory devices in the system, but only the processes on processors that belong to a particular node can directly access the dynamic memory devices within the particular node. Shared disk systems generally require less wiring than shared everything systems.

In shared nothing systems, all processors, dynamic memory devices and static memory devices are grouped into nodes. In shared nothing systems as in shared disk systems, each node may itself constitute a shared everything system or a shared disk system. Only the processes running on a particular node can directly access the dynamic memory devices and static memory devices within the particular node.

In shared nothing systems, when a data item is transferred into cache in dynamic memory from a secondary data resource in the form of a static storage device, the node that has direct access to the static storage device reads the data item into the dynamic memory of the node. If a cache in another dynamic memory of another node is the primary cache for the data item, then that data item will be transferred there, resulting in an additional transfer of the data item. This may be avoided by treating the node that has direct access to the secondary resource that holds the data item as the primary cache for the data item.

HARDWARE OVERVIEW

Figure 4:
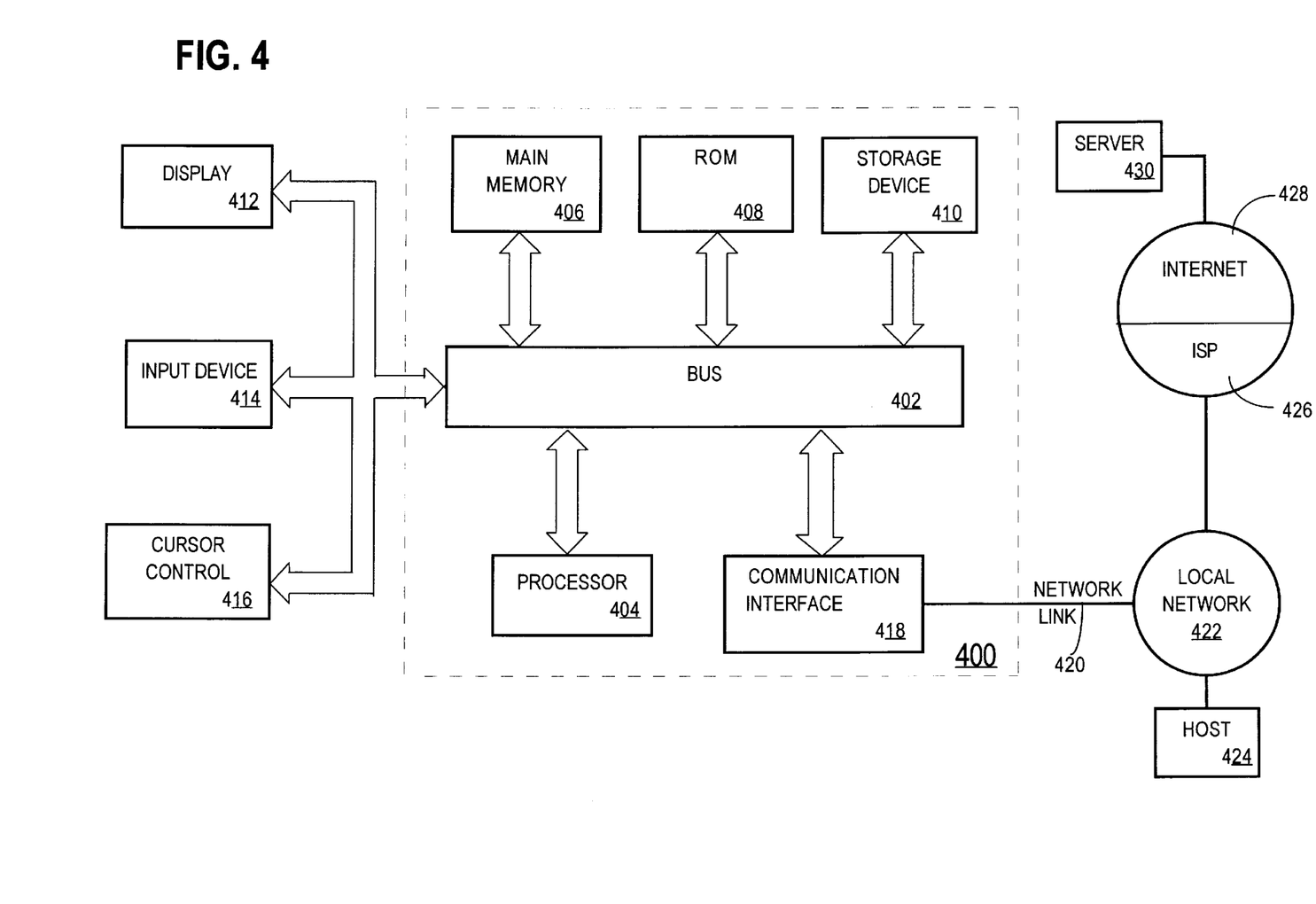
FIG. 4 is a block diagram of a computer system upon which an embodiment of the present invention may be implemented.

FIG. 4 is a block diagram that illustrates a computer system 400 which may be used to implement an embodiment of the invention. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing replacement of data stored in buffers of a plurality of caches that each reside on a node of a set of one or more nodes, wherein each node of said set of one or more nodes includes one or more caches of said plurality of caches, wherein the plurality of caches includes a first cache, the method comprising the steps of:

from a plurality of buffers available for replacement in the first cache, selecting for replacement a first buffer from said first cache based on one or more factors, wherein said first buffer is currently used to store a first data item, wherein said one or more factors include either:
the state of at least one other cache of said plurality of caches, or the configuration of said at least one other cache of said plurality of caches;

replacing said first data item stored in said first buffer with a second data item;

transferring said first data item to another particular cache of said plurality of caches;

in response to transferring said first data item to the particular cache, generating data that indicates that said first buffer contains data that may be removed from said first cache; and wherein said one or more factors include that said data indicates that said first buffer contains data that may be replaced.

2. The method of claim 1, wherein said one or more factors includes whether said first data item resides in the at least one other cache of said plurality of caches.

3. A computer-readable medium carrying one or more sequences of instructions which, when executed by one or more processors, causes the one or more processors to perform the method recited in claim 1.

4. The method of claim 1, wherein the step of generating data is not performed when said first data item belongs to a particular subset of data items stored in the first cache.

5. The method of claim 4, wherein said particular subset of data items include the most frequently accessed set of data items that currently reside in said first cache.

6. A computer-readable medium carrying one or more sequences of instructions which, when executed by one or more processors, causes the one or more processors to perform the method recited in claim 4.

7. A computer-readable medium carrying one or more sequences of instructions which, when executed by one or more processors, causes the one or more processors to perform the method recited in claim 5.

8. The method of claim 1, wherein:
before replacing said second data item, said first buffer is associated with a first cache retention value and a second buffer is associated with a second cache retention value, wherein a second cache includes said second buffer; and
wherein said one or more factors include that said first cache retention value is less than said second cache retention value.

9. The method of claim 8, wherein said first cache is managed by a first cache manager and said second cache is managed by second cache manager, wherein the method further includes the steps of:
said first cache manager receiving on behalf of said second cache manager a request for a direct transfer of a particular data item stored in the first cache;
in response to said first cache manager receiving said request, said first cache manager transmitting said first cache retention value and said particular data item to said second cache, wherein said first cache retention value indicates a lowest cache retention value of at least a subset of buffers in said first cache.

10. The method of claim 8, further including the steps of:
said first cache receiving said second data item transmitted from said second cache in response to said second cache manager determining that said second cache retention value is greater than said first cache retention value; and
wherein said factors include that said first cache received said second data item transmitted from said second cache in response to said second cache manager determining that said second cache retention value is greater than said first cache retention value.

11. A computer-readable medium carrying one or more sequences of instructions which, when executed by one or more processors, causes the one or more processors to perform the method recited in claim 8.

12. A computer-readable medium carrying one or more sequences of instructions which, when executed by one or more processors, causes the one or more processors to perform the method recited in claim 9.

13. A computer-readable medium carrying one or more sequences of instructions which, when executed by one or more processors, causes the one or more processors to perform the method recited in claim 10.

14. The method of claim 1, further including the step of transferring a copy of said first data item to a second cache of a second node without first durably storing said first data item from said first cache to persistent storage.

15. A computer-readable medium carrying one or more sequences of instructions which, when executed by one or more processors, causes the one or more processors to perform the method recited in claim 14.

16. The method of claim 1, wherein said plurality of caches are each managed by a database system.

17. A computer-readable medium carrying one or more sequences of instructions which, when executed by one or more processors, causes the one or more processors to perform the method recited in claim 16.

18. The method of claim 1, wherein said one or more factors include whether said data item becomes eligible for replacement when transferred from another particular cache of said plurality of caches.

19. A computer-readable medium carrying one or more sequences of instructions which, when executed by one or more processors, causes the one or more processors to perform the method recited in claim 18.

20. A computer-readable medium carrying one or more sequences of instructions which, when executed by one or more processors, causes the one or more processors to perform the method recited in claim 1.

21. A method for managing a global cache that includes a plurality of caches that each reside on a node of a set of one or more nodes, wherein each node of said set of one or more nodes includes a first cache that resides on a first node, the method comprising the steps of:
generating data that indicates that a copy of a first data item in a first buffer of a first cache is eligible for replacement based upon a second copy of said first data item residing in a second buffer in a second cache of said plurality of caches; and
replacing said first data item stored in said first buffer with a data item other than said first data item.

22. The method of claim 21, wherein the plurality of caches includes a first cache that resides on a first node, wherein the method includes the steps of:
selecting for replacement a first buffer from said first cache based on one or more factors, wherein said one or more factors include either
the state of at least one cache of said plurality of caches that resides on a different node than said first node, wherein said first buffer is currently used to store said first data item, or
the configuration of at least one cache of said plurality of caches that resides on a different node than said first node; and
replacing said first data item stored in said buffer with a second data item.

23. A computer-readable medium carrying one or more sequences of instructions which, when executed by one or more processors, causes the one or more processors to perform the method recited in claim 22.

24. The method of claim 21, further including the step of transferring a copy of said first data item to a second cache of a second node without first durably storing said first data item from said first cache to persistent storage.

25. A computer-readable medium carrying one or more sequences of instructions which, when executed by one or more processors, causes the one or more processors to perform the method recited in claim 24.

26. The method of claim 21, wherein said plurality of caches are each managed by a database system.

27. A computer-readable medium carrying one or more sequences of instructions which, when executed by one or more processors, causes the one or more processors to perform the method recited in claim 26.

28. A computer-readable medium carrying one or more sequences of instructions which, when executed by one or more processors, causes the one or more processors to perform the method recited in claim 21.

29. A method for managing replacement of data stored in buffers of a plurality of caches that each reside on a node of a set of one or more nodes, wherein each node of said set of one or more nodes includes one or more caches of said plurality of caches, wherein the plurality of caches includes a first cache and a second cache, the method comprising the steps of:

storing data in said first cache and said second cache, wherein said first cache is designated a primary cache for storing first data items and said second cache is designated a primary cache for storing second data items;

from a plurality of buffers available for replacement in the first cache, choosing for replacement instead of a first buffer a second buffer because the second buffer holds a data item for which the second cache is designated a primary cache but not the first cache; and replacing said data item stored in said first buffer with another data item.

30. A computer-readable medium carrying one or more sequences of instructions which, when executed by one or more processors, causes the one or more processors to perform the method recited in claim 29.

* * * * *

UNITED STATES PATENT AND TRADEMARK OFFICE
CERTIFICATE OF CORRECTION

PATENT NO.      : 6,633,891 B1
DATED           : October 14, 2003
INVENTOR(S)     : Roger Bamford et al.

It is certified that error appears in the above-identified patent and that said Letters Patent is hereby corrected as shown below:

<u>Column 12,</u>
Lines 11-14, replace "A computer-readable medium carrying one or more sequences of instructions which, when executed by one or more processors, causes the one or more processors to perform the method recited in claim 1" with -- A computer-readable medium carrying one or more sequences of instructions which, when executed by one or more processors, causes the one or more processors to perform the method recited in claim 2 --.

Signed and Sealed this

Twentieth Day of January, 2004

JON W. DUDAS
*Acting Director of the United States Patent and Trademark Office*